United States Patent
Fukushi et al.

(10) Patent No.: US 11,830,994 B2
(45) Date of Patent: Nov. 28, 2023

(54) ELECTRICITY STORAGE DEVICE INCLUDING A PLURALITY OF COOLING LAYERS

(71) Applicant: TOYOTA JIDOSHA KABUSHIKI KAISHA, Toyota (JP)

(72) Inventors: Takanori Fukushi, Toyota (JP); Yusuke Suzuki, Miyoshi (JP); Tadahiro Kondo, Toyota (JP); Hiroki Tashiro, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 17/503,704

(22) Filed: Oct. 18, 2021

(65) Prior Publication Data
US 2022/0166081 A1 May 26, 2022

(30) Foreign Application Priority Data

Nov. 25, 2020 (JP) .................... 2020-194872

(51) Int. Cl.
*H01M 10/613* (2014.01)
*H01M 10/6555* (2014.01)
*H01M 10/6551* (2014.01)
*H01M 10/625* (2014.01)

(52) U.S. Cl.
CPC ..... *H01M 10/613* (2015.04); *H01M 10/6551* (2015.04); *H01M 10/6555* (2015.04); *H01M 10/625* (2015.04)

(58) Field of Classification Search
CPC .......... H01M 10/613; H01M 10/6551; H01M 10/6555; H01M 10/625
See application file for complete search history.

(56) References Cited

U.S. PATENT DOCUMENTS

2017/0222283 A1    8/2017  Choi

FOREIGN PATENT DOCUMENTS

| CN | 101340012 A | 1/2009 | |
| CN | 205595422 U | 9/2016 | |
| CN | 208674219 U | 3/2019 | |
| JP | 6448069 B2 | 1/2019 | |
| JP | 2020-009694 A | 1/2020 | |
| JP | 2020009694 A * | 1/2020 | ............ B60K 11/02 |
| JP | 2020-113410 A | 7/2020 | |
| JP | 6781300 B1 | 11/2020 | |

* cited by examiner

*Primary Examiner* — Jimmy Vo
(74) *Attorney, Agent, or Firm* — Dinsmore & Shohl LLP (57) ABSTRACT

An electricity storage device includes an electricity storage module and a cooling device disposed adjacent to the electricity storage module. The cooling device includes a first cooling layer that is adjacent to the electricity storage module and a second cooling layer that is located on the opposite side of the first cooling layer from the electricity storage module. In the first cooling layer, a plurality of first cooling channels that is disposed at intervals in an array direction and first walls that are located between the first cooling channels are formed. In the second cooling layer, a plurality of second cooling channels that is disposed at intervals in the array direction and second walls that are located between the second cooling channels are formed. At least some of the first walls are disposed so as to be offset from the second walls.

8 Claims, 6 Drawing Sheets

ELECTRICITY STORAGE DEVICE INCLUDING A PLURALITY OF COOLING LAYERS

CROSS-REFERENCE TO RELATED APPLICATION

This application claims priority to Japanese Patent Application No. 2020-194872 filed on Nov. 25, 2020, incorporated herein by reference in its entirety.

BACKGROUND

1. Technical Field

This disclosure relates to an electricity storage device.

2. Description of Related Art

Various proposals have been hitherto made on electricity storage devices having a battery module and a cooling device that cools the battery module.

For example, the electricity storage device described in Japanese Unexamined Patent Application Publication No. 2020-9694 includes a battery module and a cooling device disposed on a lower surface of the battery module.

The cooling device includes a first planar member, a second planar member disposed under the first planar member so as to be spaced therefrom, and a plurality of walls disposed between the first planar member and the second planar member.

The battery module is disposed on an upper surface of the first planar member. Each wall is formed so as to connect the first planar member and the second planar member to each other. The walls are disposed at intervals in a Y-direction, and coolant channels are formed between the walls. The coolant channels are formed so as to extend in an X-direction, which is a direction orthogonal to the Y-direction.

SUMMARY

Suppose that the electricity storage device configured as described above is disposed on a bottom surface etc. of a vehicle. When the vehicle runs on an uneven road, the bottom surface of the vehicle and the road surface may interfere with each other.

In this case, an impact force is applied to the electricity storage device from under the electricity storage device, and this impact force is applied to the second planar member.

Since the walls connect the first planar member and the second planar member to each other, the impact force applied to the second planar member is transmitted to the first planar member through the walls.

Since the battery module is disposed on the upper surface of the first planar member, the impact force transmitted to the first planar member is transmitted to the battery module as well. This may result in adverse effects, such as damage to the battery module.

This disclosure has been contrived in view of the above problem, and an object thereof is to provide an electricity storage device in which an impact force, if any, applied from under the electricity storage device is less likely to be transmitted to the electricity storage module.

This electricity storage device includes an electricity storage module and a cooling device disposed adjacent to the electricity storage module. The cooling device includes a first cooling layer that is adjacent to the electricity storage module and a second cooling layer that is located on the opposite side of the first cooling layer from the electricity storage module. In the first cooling layer, a plurality of first cooling channels that is disposed at intervals in an array direction and first walls that are located between the first cooling channels are formed. In the second cooling layer, a plurality of second cooling channels that is disposed at intervals in the array direction and second walls that are located between the second cooling channels are formed. At least some of the first walls are disposed so as to be offset from the second walls.

The cooling device may have a refrigerant supply part that extends in the array direction and is connected to the first cooling channels and the second cooling channels. The refrigerant supply part may have a center portion located at the center in the array direction, a first portion located from one end to the center in the array direction, and a second portion located from the other end to the center in the array direction. A supply opening through which a refrigerant is supplied to the refrigerant supply part may be formed at the first portion. The cross-sectional area of a first cooling channel located on the side of the first portion may be larger than the cross-sectional area of the first cooling channel located on the side of the second portion.

The cooling device may have a refrigerant supply part that extends in the array direction and is connected to the first cooling channels and the second cooling channels. The refrigerant supply part may have a center portion located at the center in the array direction, a first portion located from one end to the center in the array direction, and a second portion located from the other end to the center in the array direction. A supply opening through which a refrigerant is supplied to the refrigerant supply part may be formed at the first portion. The cross-sectional area of a second cooling channel located on the side of the first portion may be larger than the cross-sectional area of a second cooling channel located on the side of the second portion.

The cooling device may include a third cooling layer that is formed at a position adjacent to the first cooling layer and the second cooling layer in the array direction, and a refrigerant supply part that extends in the array direction. A third cooling channel may be formed in the third cooling layer. The refrigerant supply part may be formed so as to connect the first cooling channels, the second cooling channels, and the third cooling channel to one another. The refrigerant supply part may have a center portion located at the center in the array direction, a first portion located from one end to the center in the array direction, and a second portion located from the other end to the center in the array direction. A supply opening through which a refrigerant is supplied to the refrigerant supply part may be formed at the first portion. The cross-sectional area of the third cooling channel may be larger than the cross-sectional area of the first cooling channel.

In the electricity storage device according to this disclosure, an impact force, if any, applied from under the electricity storage device is less likely to be transmitted to the electricity storage module.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An electricity storage device according to an embodiment will be described using FIG. 1 to FIG. 9. Those of the components shown in FIG. 1 to FIG. 9 that are the same or substantially the same will be denoted by the same reference signs while an overlapping description thereof will be omitted.

Figure 1:
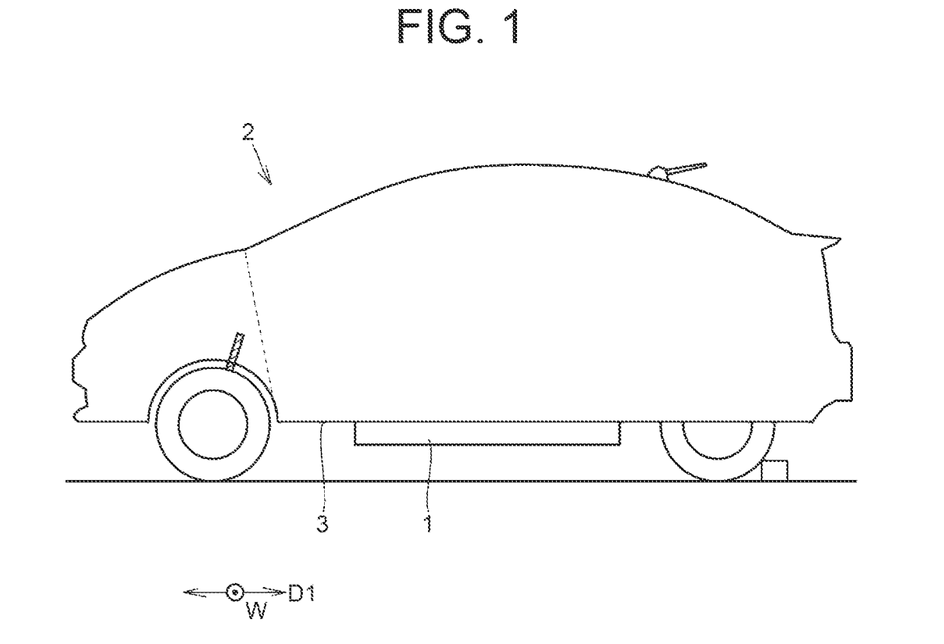
FIG. 1 is a schematic view schematically showing a vehicle 2 equipped with an electricity storage device 1 according to an embodiment.

FIG. 1 is a schematic view schematically showing a vehicle 2 equipped with an electricity storage device 1 according to the embodiment.

The vehicle 2 includes a floor panel 3 that forms a bottom surface of the vehicle 2. The floor panel 3 is a plate-shaped metal member. The electricity storage device 1 is disposed on a lower surface of the floor panel 3.

Figure 2:
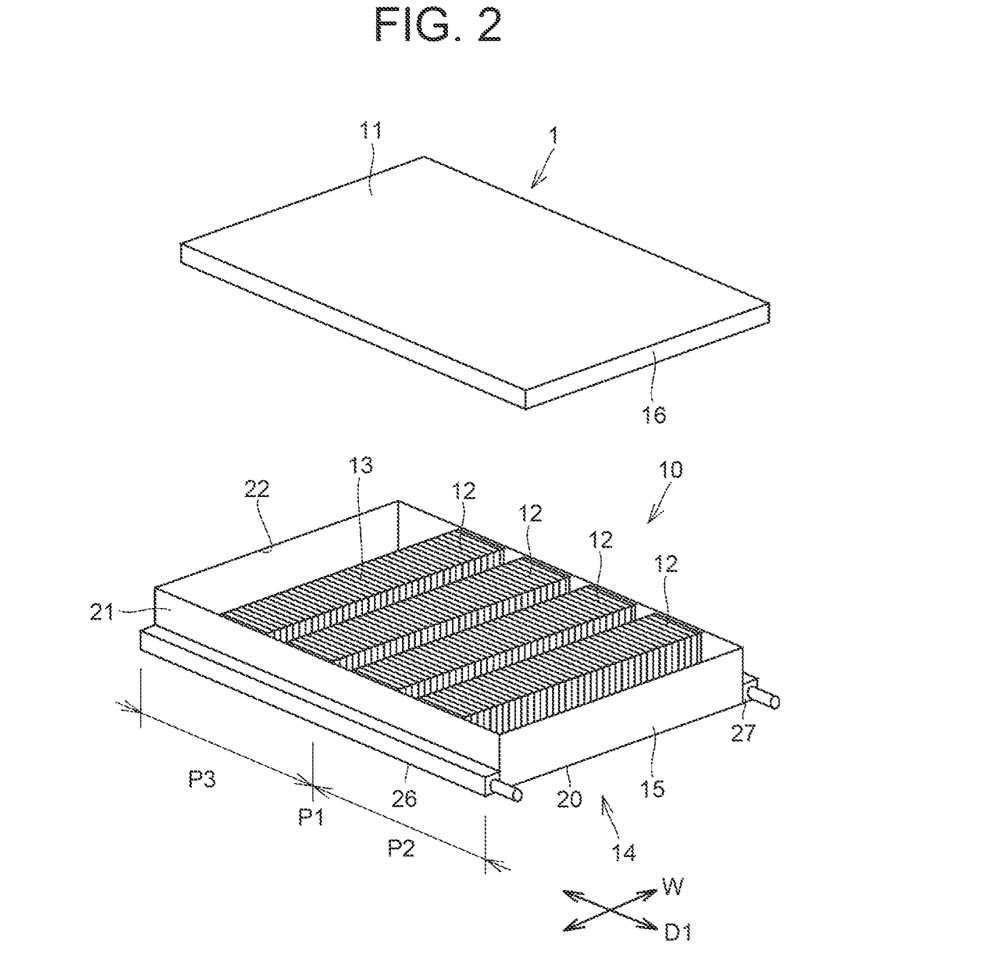
FIG. 2 is an exploded perspective view schematically showing the electricity storage device 1.

FIG. 2 is an exploded perspective view schematically showing the electricity storage device 1. The electricity storage device 1 includes an electricity storage module 10, a housing case 11, and a cooling device 14. The electricity storage module 10 includes a plurality of electricity storage units 12 disposed at intervals in a vehicle front-rear direction (array direction) D1. Each electricity storage unit 12 includes a plurality of electricity storage cells 13 arrayed in a vehicle width direction W. The electricity storage cells 13 are, for example, secondary batteries such as lithium-ion batteries.

The housing case 11 houses the electricity storage module 10 inside. The housing case 11 includes a lower case 15 and an upper case 16. The lower case 15 includes a bottom plate 20 and a peripheral wall 21. The peripheral wall 21 is formed so as to extend upward from an outer periphery of the bottom plate 20. The lower case 15 has an opening 22 that opens upward. The upper case 16 is provided so as to close the opening 22. The lower case 15 and the upper case 16 are made of a metal material, such as aluminum.

Figure 3:
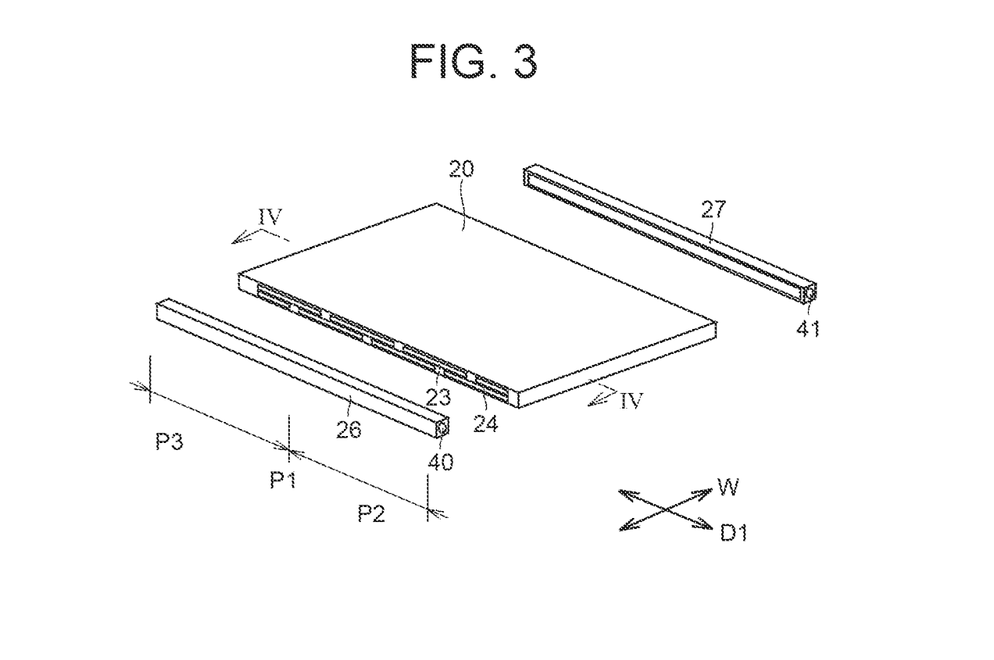
FIG. 3 is an exploded perspective view showing a cooling device 14.

FIG. 3 is an exploded perspective view showing the cooling device 14. The cooling device 14 includes the bottom plate 20 in which pluralities of cooling channels 23, 24 are formed, a refrigerant supply part 26, and a refrigerant discharge part 27.

The refrigerant supply part 26 is provided on a right side surface of the bottom plate 20 and the refrigerant discharge part 27 is provided on a left side surface of the bottom plate 20.

The refrigerant supply part 26 is formed so as to extend in the vehicle front-rear direction D1. Here, the refrigerant supply part 26 includes a center portion P1, a front-side portion (first portion) P2, and a rear-side portion (second portion) P3. The center portion P1 is located at the center of the refrigerant supply part 26 in the vehicle front-rear direction D1. The front-side portion P2 is located between the center portion P1 and a front end of the refrigerant supply part 26. The rear-side portion P3 is located from the center portion P1 to a rear end of the refrigerant supply part 26.

The refrigerant supply part 26 has a supply opening 40 through which a refrigerant C is supplied, and the supply opening 40 is formed at the front-side portion P2. Specifically, the supply opening 40 is formed at a front end portion of the refrigerant supply part 26. A supply pipe (not shown) is connected to the supply opening 40, and the refrigerant C is supplied into the refrigerant supply part 26 through the supply opening 40.

The refrigerant discharge part 27 is also formed so as to extend in the vehicle front-rear direction D1, and a discharge opening 41 is formed at a front end of the refrigerant discharge part 27. A discharge pipe (not shown) is connected to the discharge opening 41. The discharge pipe and the supply pipe are connected to a radiator etc. (not shown).

Figure 4:
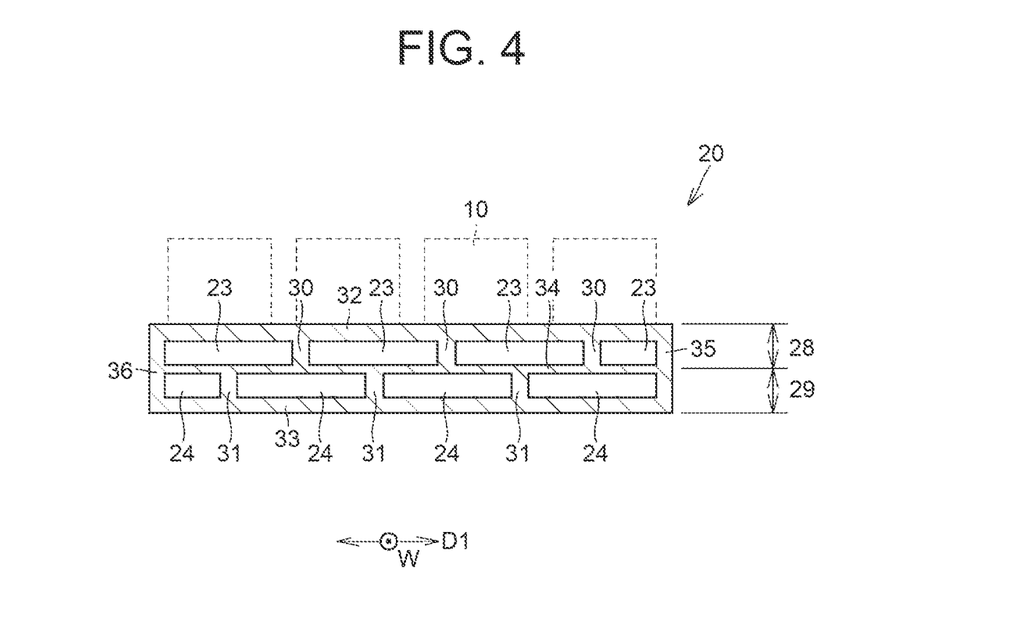
FIG. 4 is a sectional view taken along line IV-IV of FIG. 3.

FIG. 4 is a sectional view taken along line IV-IV of FIG. 3. The bottom plate 20 has a cooling layer (first cooling layer) 28 in which the cooling channels (first cooling channels) 23 are located and a cooling layer (second cooling layer) 29 in which the cooling channels 24 are located.

The electricity storage module 10 is disposed on an upper surface of the bottom plate 20. The cooling layer 28 is adjacent to the electricity storage module 10, and the cooling layer 28 is located under the electricity storage module 10.

The cooling layer 29 is located on the opposite side of the cooling layer 28 from the electricity storage module 10, and the cooling layer 29 is located under the cooling layer 28.

In the cooling layer 28, the cooling channels (first cooling channels) 23 that are disposed at intervals in the vehicle front-rear direction D1 and walls (first walls) 30 that are located between the cooling channels 23 are formed. The cooling channels 23 are formed so as to extend in the vehicle width direction W, and the walls 30 are also formed so as to extend in the vehicle width direction W.

In the cooling layer 29, the cooling channels (second cooling channels) 24 that are disposed at intervals in the vehicle front-rear direction D1 and walls (second walls) 31 that are located between the cooling channels 24 are formed. The cooling channels 24 are formed so as to extend in the vehicle width direction W, and the walls 31 are also formed so as to extend in the vehicle width direction W.

The bottom plate 20 includes a top plate 32, a bottom plate 33, a middle wall 34, a front wall 35, and a rear wall 36. The top plate 32 forms the upper surface of the bottom plate 20, and the bottom plate 33 forms a bottom surface of the bottom plate 20. The top plate 32 and the bottom plate 33 are disposed at an interval in an up-down direction, and the middle wall 34 is disposed between the top plate 32 and the bottom plate 33.

The walls 30 are formed so as to connect the top plate 32 and the middle wall 34 to each other, and the walls 31 are formed so as to connect the bottom plate 33 and the middle wall 34 to each other.

The walls 30 and the walls 31 are disposed so as to be offset from each other in the vehicle front-rear direction D1. Thus, the walls 30 are not located on an upper end side of the walls 31, and the cooling channels 23 are located on the upper end side of the walls 31.

The front wall 35 connects a front-side edge of the top plate 32 and a front-side edge of the bottom plate 33 to each other, and a front-side edge of the middle wall 34 is also connected to the front wall 35. The rear wall 36 connects a rear-side edge of the top plate 32 and a rear-side edge of the bottom plate 33 to each other, and a rear-side edge of the middle wall 34 is also connected to the front wall 35.

The cooling channels 23 are formed between the top plate 32 and the middle wall 34, at intervals in the vehicle front-rear direction D1, and the cooling channels 24 are formed at intervals between the bottom plate 33 and the middle wall 34.

Here, the refrigerant supply part 26 and the refrigerant discharge part 27 shown in FIG. 3 extend along the front wall 35 and the rear wall 36.

In the electricity storage device 1 thus configured, the electricity storage module 10 is cooled by the cooling device 14. Specifically, the refrigerant C supplied into the refrigerant supply part 26 through the supply opening 40 shown in FIG. 3 is supplied to each of the cooling channels 23 and each of the cooling channels 24 shown in FIG. 4. Then, the refrigerant C having flowed through the cooling channels 23 and the cooling channels 24 enters the refrigerant discharge part 27 shown in FIG. 3 and is discharged to the discharge pipe through the discharge opening 41. The refrigerant C having been discharged from the discharge pipe is cooled in the radiator etc. (not shown) and supplied to the refrigerant supply part 26. Thus, the electricity storage module 10 is cooled as the refrigerant C flows through the cooling channels 23, 24.

In FIG. 1, the electricity storage device 1 is provided on the lower surface of the vehicle 2. When the vehicle 2 runs on an uneven road, for example, a bottom surface of the electricity storage device 1 may interfere with the road surface.

In FIG. 4, when the bottom surface of the electricity storage device 1 interferes with the road surface, an impact force is applied to the bottom plate 33. The impact force applied to the bottom plate 33 is transmitted to the walls 31.

The cooling channels 23 are located on the upper end side of the walls 31, and the walls 30 are not located on the upper end side of the walls 31. Thus, the impact force transmitted to the walls 31 is less likely to be directly transmitted to the walls 30, and this impact force is less likely to be transmitted to the top plate 32 through the walls 30. Therefore, the impact force is less likely to be applied from the top plate 32 to the electricity storage module 10.

Here, the middle wall 34 is deformed by the impact force transmitted to the walls 31. The cooling channels 23 are located on the upper end side of the walls 31, and the middle wall 34 deforms so as to bulge upward and thereby reduce the cross-sectional areas of the cooling channels 23. Since the top plate 32 is disposed above the middle wall 34 so as to be spaced therefrom, the deformed middle wall 34 is less likely to come into contact with the top plate 32. Thus, the impact force is less likely to be applied from the top plate 32 to the electricity storage module 10.

In the above embodiment, all the walls 30 and the walls 31 are disposed so as to be offset from each other in the vehicle front-rear direction D1, but only some of the walls 30 and some of the walls 31 may be offset from each other in the vehicle front-rear direction D1.

Modified Example 1

Figure 5:
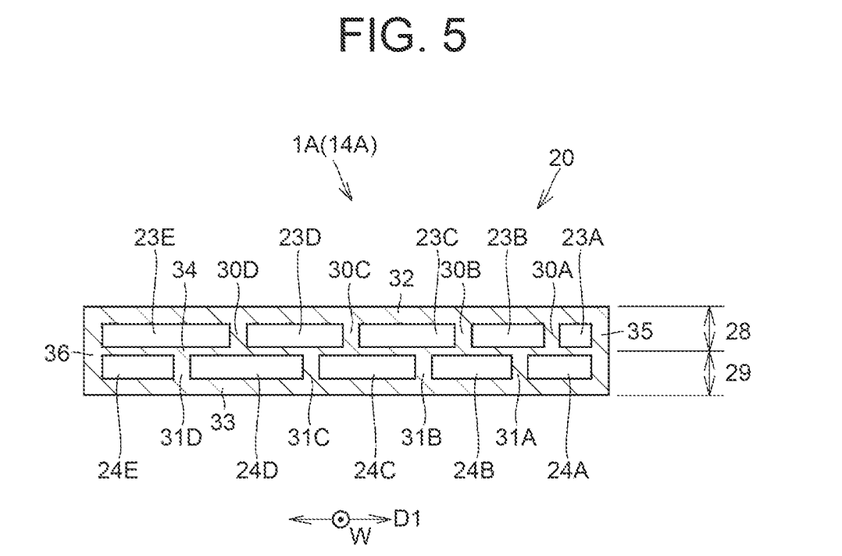
FIG. 5 is a sectional view showing an electricity storage device 1A that is a first modified example of the electricity storage device.

FIG. 5 is a sectional view showing an electricity storage device 1A that is a first modified example of the electricity storage device. The electricity storage device 1A includes a cooling device 14A. In the cooling device 14A, the bottom plate 20 has a plurality of cooling channels 23A to 23E and a plurality of cooling channels 24A to 24E.

The cooling channels 23A, 23B, 23C, 23D, 23E are sequentially arrayed from a vehicle front side toward a vehicle rear side. Similarly, the cooling channels 24A, 24B, 24C, 24D, 24E are arrayed from the vehicle front side toward the rear side.

When the cross-sectional areas of the cooling channels 23A, 23B, 23C, 23D, 23E in a cross-section perpendicular to the extension direction of the cooling channels 23A to 23E are referred to as cross-sectional areas $S23A$, $S23B$, $S23C$, $S23D$, $S23E$, the relationship among these cross-sectional areas is described by the following Expression (1):

$$S23A < S23B < S23C < S23D < S23E \quad (1)$$

When the cross-sectional areas of the cooling channels 24A, 24B, 24C, 24D in a cross-section perpendicular to the extension direction of the cooling channels 24A to 24D are referred to as cross-sectional areas $S24A$, $S24B$, $S24C$, $S24D$, the relationship among these cross-sectional areas is described by the following Expression (2):

$$S24A < S24B < S24C < S24D \quad (2)$$

Walls 30A to 30D are disposed between the cooling channels 23A to 23E, and walls 31A to 31D are disposed between the cooling channels 24A to 24E.

Also in the cooling device 14A, the walls 30A to 30D and the walls 31A to 31D are formed so as to be offset from each other in the vehicle front-rear direction D1. On the upper end side of the walls 31A to 31D, the cooling channels 23A, 23B, 23C, 23D, 23E are located. The cooling device 14A is also provided with the refrigerant supply part 26 and the refrigerant discharge part 27 shown in FIG. 3.

Also in the cooling device 14A thus configured, the refrigerant C is supplied to the cooling channels 23A to 23E and the cooling channels 24A to 24E through the refrigerant supply part 26.

Here, the supply opening 40 is formed at the front-side portion P2 of the refrigerant supply part 26, specifically at the front end portion of the refrigerant supply part 26. Therefore, after flowing through the refrigerant supply part 26, the refrigerant C sequentially enters the cooling channels 23A, 23B, 23C, 23D, 23E and the cooling channels 24A, 24B, 24C, 24D, 24E.

Since the cross-sectional areas of the cooling channels 23A, 23B, 23C, 23D, 23E have the relationship of the above Expression (1), the inflow amounts of the refrigerant C entering the cooling channels 23A, 23B, 23C, 23D, 23E are likely to be uniformized.

Similarly, since the cross-sectional areas of the cooling channels 24A, 24B, 24C, 24D have the relationship of the above Expression (2), the inflow amounts of the refrigerant C entering the cooling channels 24A, 24B, 24C, 24D are likely to be uniformized.

Also in the cooling device 14A, the walls 30A to 30D and the walls 31A to 31D are disposed so as to be offset from each other in the vehicle front-rear direction D1. Thus, an impact force, if any, applied from the lower surface side of the cooling device 14A is less likely to be transmitted to the electricity storage module 10.

Modified Example 2

The example in which the refrigerant C is supplied from the front end side (front-side portion P2) of the refrigerant supply part 26 to the refrigerant supply part 26 in the electricity storage device 1A shown in FIG. 5 has been described. Alternatively, the refrigerant C may be supplied from the side of the rear-side portion P3 to the refrigerant supply part 26.

Figure 6:
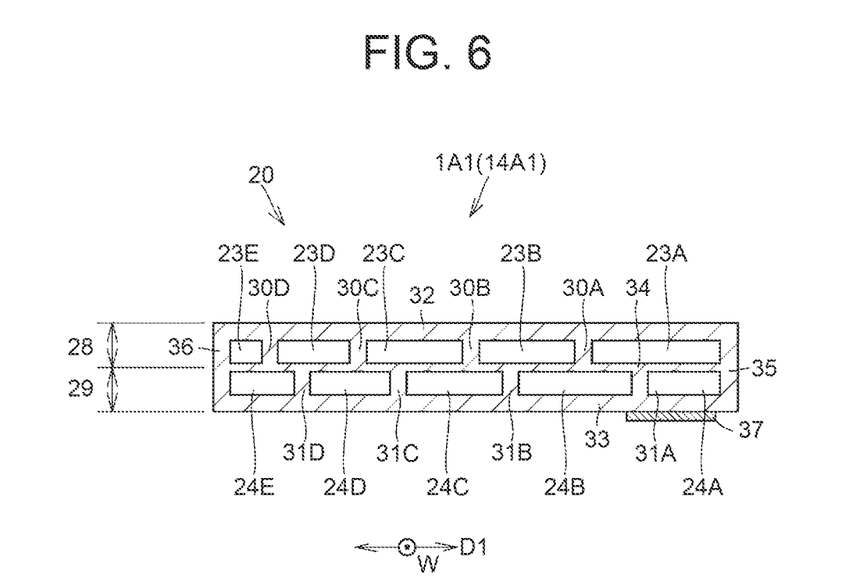
FIG. 6 is a sectional view showing an electricity storage device 1A1 according to a second modified example of the electricity storage device.

FIG. 6 is a sectional view showing an electricity storage device 1A1 according to a second modified example of the electricity storage device. In the electricity storage device 1A1, the refrigerant C is supplied from the side of a rear end portion of the refrigerant supply part 26. The relationship among the cross-sectional areas of the cooling channels 23A, 23B, 23C, 23D, 23E is described by the following Expression (3):

$$S23A > S23B > S23C > S23D > S23E \qquad (3)$$

Similarly, the relationship among the cross-sectional areas S24A, S24B, S24C, S24D of the cooling channels 24A, 24B, 24C, 24D is described by the following Expression (4):

$$S24A > S24B > S24C > S24D \qquad (4)$$

Thus, the inflow amounts of the refrigerant C entering the cooling channels 23A, 23B, 23C, 23D, 23E and the cooling channels 24A, 24B, 24C, 24D are uniformized.

The electricity storage device 1A1 includes a protector 37 that is provided on the lower surface of the bottom plate 20. The protector 37 is provided on the front side in the lower surface of the bottom plate 20. The protector 37 is formed so as to extend in the vehicle width direction W. In the electricity storage device 1A1, the intervals between the walls 30A to 30D formed in the bottom plate 20 are wider on the front side than on the rear side. Similarly, the intervals between the walls 31A to 31D are wider on the front side than on the rear side.

Accordingly, the rigidity of the bottom plate 20 on the front side is lower than the rigidity of the bottom plate 20 on the rear side. Meanwhile, the protector 37 is provided on the front side of the bottom plate 20, and the rigidity of the bottom plate 20 on the front side is thereby reinforced.

When the vehicle 2 is running and there is an obstacle lying on the road, the front side of the electricity storage device 1A1 may collide with the obstacle. Since the rigidity of the bottom plate 20 on the front side is reinforced, the bottom plate 20 is less likely to deform significantly.

Modified Example 3

Figure 7:
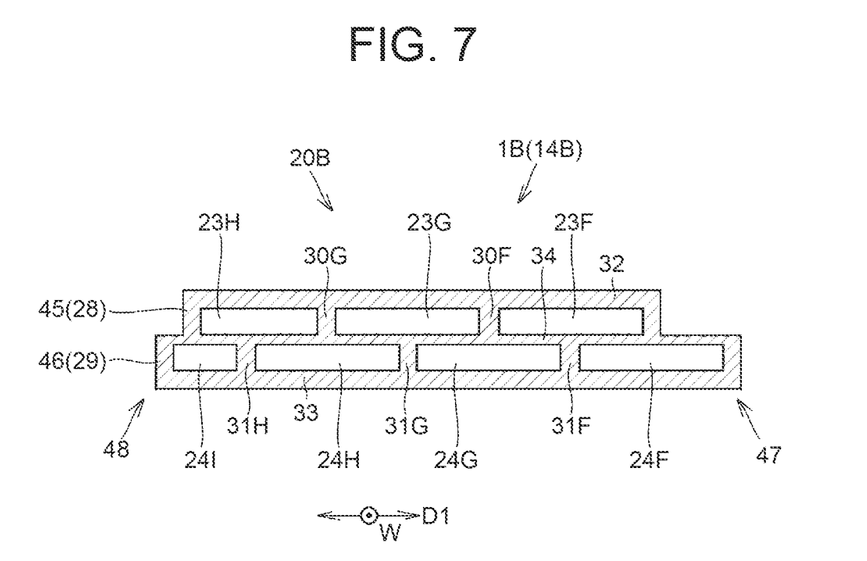
FIG. 7 is a sectional view showing an electricity storage device 1B according to a third modified example of the electricity storage device.

FIG. 7 is a sectional view showing an electricity storage device 1B according to a third modified example of the electricity storage device. The electricity storage device 1B includes a cooling device 14B. A bottom plate 20B of the cooling device 14B has an upper stage 45 and a lower stage 46. The length of the upper stage 45 is shorter than the length of the lower stage 46 in the vehicle front-rear direction D1.

A front end portion of the upper stage 45 is located on the rear side relatively to a front end portion of the lower stage 46, and a rear end portion of the upper stage 45 is located on the front side relatively to a rear end portion of the lower stage 46.

Thus, a protrusion 47 is formed by the lower stage 46 on the front side of the bottom plate 20B, and a protrusion 48 is formed by the lower stage 46 on the rear side of the bottom plate 20B.

The electricity storage module 10 is disposed on an upper surface of the upper stage 45. The cooling layer 28 is located in the upper stage 45, and a plurality of cooling channels 23F, 23G, 23H is formed in the upper stage 45. Walls 30F, 30G are formed between the cooling channels 23F, 23G, 23H.

The cooling layer 29 is located in the lower stage 46, and a plurality of cooling channels 24F, 24G, 24H, 24I is formed in the lower stage 46. Walls 31F, 31G, 31H are formed between the cooling channels 24F, 24G, 24H, 24I. Also in the cooling device 14B, the walls 31F, 31G, 31H and the walls 30F, 30G are disposed so as to be offset from each other in the vehicle front-rear direction D1.

When the vehicle equipped with the electricity storage device 1B thus configured is running, an obstacle, such as a fallen object, may lie on the road. In this case, the front side of the electricity storage device 1B may collide with the obstacle.

In this case, the obstacle comes into contact with the protrusion 47 of the bottom plate 20B. Since the protrusion 47 protrudes toward the front side beyond the upper stage 45, the obstacle is less likely to come into contact with the upper stage 45. Thus, an impact force is less likely to be transmitted to the electricity storage module 10 provided on the upper surface of the upper stage 45.

When the vehicle is moving backward and there is an obstacle on the road, the protrusion 48 collides with the obstacle. Since the protrusion 48 protrudes toward the rear side beyond the upper stage 45, the upper stage 45 is less likely to collide with the obstacle. Thus, an impact force is less likely to be transmitted to the electricity storage module 10 through the upper stage 45.

Modified Example 4

Figure 8:
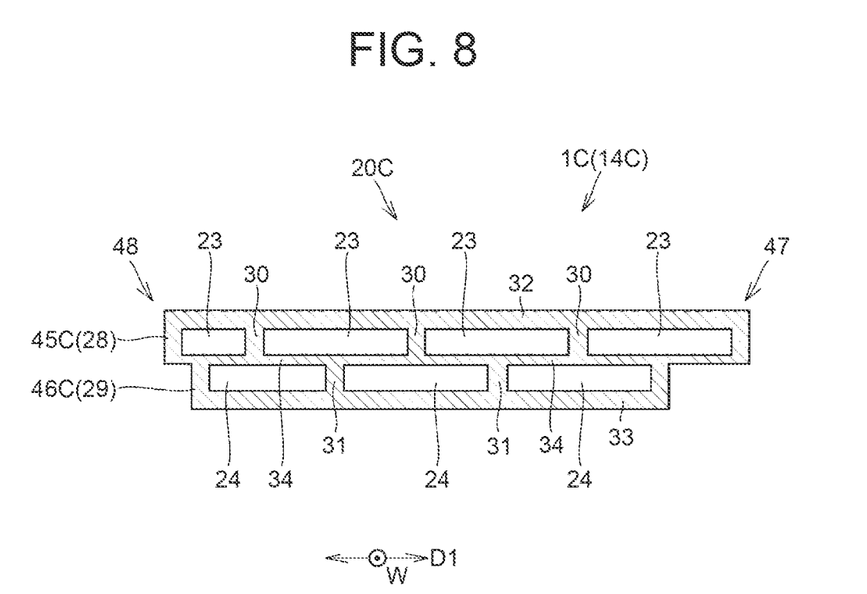
FIG. 8 is a sectional view showing an electricity storage device 1C according to a fourth modified example of the electricity storage device.

FIG. 8 is a sectional view showing an electricity storage device 1C according to a fourth modified example of the electricity storage device. The electricity storage device 1C includes a cooling device 14C, and the cooling device 14C includes a bottom plate 20C.

The bottom plate 20C includes an upper stage 45C and a lower stage 46C. The length of the upper stage 45C is longer than the length of the lower stage 46C in the vehicle front-rear direction D1.

A front end portion of the lower stage 46C is located on the rear side relatively to a front end portion of the upper stage 45C. A rear end portion of the lower stage 46C is located on the front side relatively to a rear end portion of the upper stage 45C.

The electricity storage module 10 is disposed on an upper surface of the upper stage 45C. The cooling layer 28 is located in the upper stage 45C, and the cooling channels 23 are formed in the upper stage 45C. The cooling layer 29 is located in the lower stage 46C, and the cooling channels 24 are formed in the lower stage 46C.

The vehicle equipped with the electricity storage device 1C may run over a bump. Here, the electricity storage device 1C approaches the bumpy area of the road before front wheels of the vehicle 2 run onto the bump.

A front end of the lower stage 46C is located on the rear side relatively to the upper stage 45C. Therefore, the bumpy area of the road is less likely to come into contact with the lower stage 46C before the front wheels of the vehicle 2 run onto the bump on the road. When the front wheels run onto the bump, the lower stage 46C also moves upward, so that the lower stage 46C does not come into contact with the bumpy area of the road.

The vehicle 2 may run over a bump on the road while moving backward. Also in this case, since a rear end of the lower stage 46C is located on the front side relatively to a rear end of the upper stage 45C, the lower stage 46C is less likely to interfere with the bump on the road.

Modified Example 5

Figure 9:
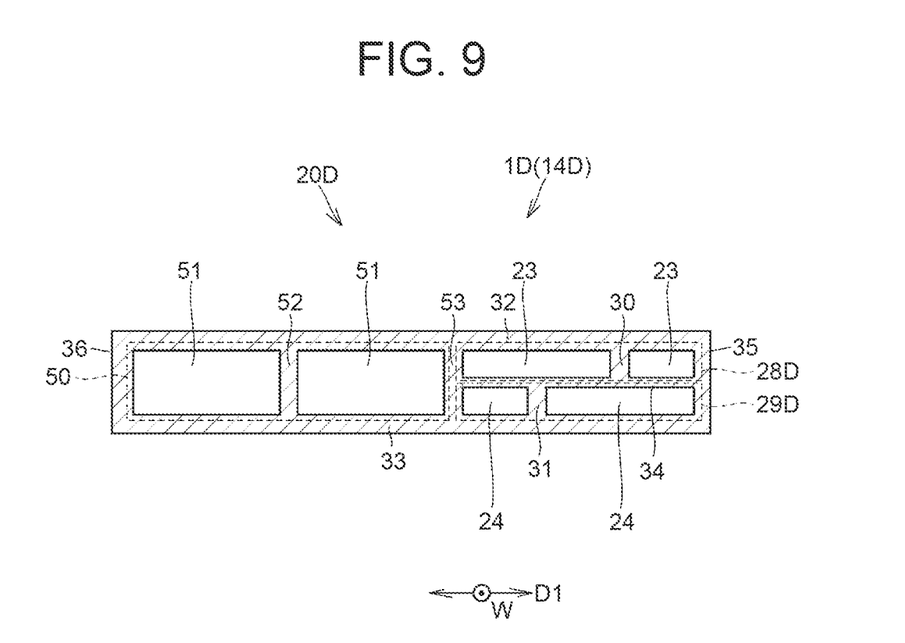
FIG. 9 is a sectional view showing an electricity storage device 1D according to a fifth modified example of the electricity storage device.

FIG. 9 is a sectional view showing an electricity storage device 1D according to a fifth modified example of the electricity storage device. The electricity storage device 1D includes a cooling device 14D, and the cooling device 14D has a bottom plate 20D.

The bottom plate 20D has a cooling layer (first cooling layer) 28D, a cooling layer (second cooling layer) 29D, and a cooling layer (third cooling layer) 50.

In the vehicle front-rear direction D1, the cooling layer 28D and the cooling layer 29D are located on the front side relatively to the center of the bottom plate 20D. The cooling layer 29D is located under the cooling layer 28D. In the vehicle front-rear direction D1, the cooling layer 50 is formed at a position adjacent to the cooling layer 28D and the cooling layer 29D. Specifically, the cooling layer 50 is located on the rear side relatively to the cooling layer 28D and the cooling layer 29D.

In the cooling layer 28D, the cooling channels 23 and the wall 30 are formed, and the wall 30 is located between the cooling channels 23. In the cooling layer 29D, the cooling channels 24 and the wall 31 are formed, and the wall 31 is located between the cooling channels 24.

In the cooling layer 50, a plurality of cooling channels 51, a wall 52, and a partition wall 53 are formed. The wall 52 is located between the cooling channels 51. The partition wall 53 is located between the cooling channels 51 and the cooling channels 23, 24. Each cooling channel 51 is formed across the top plate 32 and the bottom plate 33 in the up-down direction.

In the bottom plate 20D, a rear end edge of the middle wall 34 is connected to the partition wall 53 and the middle wall 34 does not reach the rear wall 36.

The cross-sectional area of each cooling channel 51 is larger than the cross-sectional area of the cooling channel 23, and similarly, the cross-sectional area of each cooling channel 51 is larger than the cross-sectional area of the cooling channel 24.

Therefore, when the refrigerant C is supplied from the front side of the refrigerant supply part 26 as shown in FIG. 3, the inflow amounts of the refrigerant C entering the cooling channels 23, 24, 51 are uniformized.

The embodiment disclosed this time should be regarded as being in every respect merely illustrative and not restrictive. The scope of the present disclosure is defined by the claims and intended to include all changes that are equivalent in meaning and scope to the claims.

What is claimed is:

1. An electricity storage device comprising:
an electricity storage module; and
a cooling device disposed adjacent to the electricity storage module, wherein:
the cooling device includes a first cooling layer that is adjacent to the electricity storage module and a second cooling layer that is located on the opposite side of the first cooling layer from the electricity storage module;
in the first cooling layer, a plurality of first cooling channels that is disposed at intervals in an array direction and first walls that are located between the first cooling channels are formed;
in the second cooling layer, a plurality of second cooling channels that is disposed at intervals in the array direction and second walls that are located between the second cooling channels are formed;
at least some of the first walls are disposed so as to be offset from the second walls; and
the intervals between the first walls are wider at a front side of the cooling device than at a rear side of the cooling device, and the intervals between the second walls are wider at the front side of the cooling device than at the rear side of the cooling device.

2. The electricity storage device according to claim 1, wherein:
the cooling device includes a refrigerant supply part that extends in the array direction and is connected to the first cooling channels and the second cooling channels;
the refrigerant supply part has a center portion located at a center in the array direction, a first portion located from one end to the center in the array direction, and a second portion located from the other end to the center in the array direction;
a supply opening through which a refrigerant is supplied to the refrigerant supply part is formed at the first portion; and
a cross-sectional area of a first cooling channel located on a side of the first portion is larger than a cross-sectional area of a first cooling channel located on a side of the second portion.

3. The electricity storage device according to claim 1, wherein:
the cooling device includes a refrigerant supply part that extends in the array direction and is connected to the first cooling channels and the second cooling channels;
the refrigerant supply part has a center portion located at a center in the array direction, a first portion located from one end to the center in the array direction, and a second portion located from the other end to the center in the array direction;
a supply opening through which a refrigerant is supplied to the refrigerant supply part is formed at the first portion; and
a cross-sectional area of a second cooling channel located on a side of the first portion is larger than a cross-sectional area of a second cooling channel located on a side of the second portion.

4. The electricity storage device according to claim 1, wherein:
the cooling device includes a third cooling layer that is formed at a position adjacent to the first cooling layer and the second cooling layer in the array direction, and a refrigerant supply part that extends in the array direction;
a third cooling channel is formed in the third cooling layer;
the refrigerant supply part is formed so as to connect the first cooling channels, the second cooling channels, and the third cooling channel to one another;
the refrigerant supply part has a center portion located at a center in the array direction, a first portion located from one end to the center in the array direction, and a second portion located from the other end to the center in the array direction;

a supply opening through which a refrigerant is supplied to the refrigerant supply part is formed at the first portion; and a cross-sectional area of the third cooling channel is larger than a cross-sectional area of the first cooling channel.

5. A vehicle comprising the electricity storage device according to claim 1, wherein the first cooling channels extend in a width direction of the vehicle.

6. The vehicle of claim 5, wherein the second cooling channels extend in the width direction of the vehicle.

7. The electricity storage device of claim 1, wherein
two first cooling channels of the plurality of first cooling channels, which are adjacent each other, and one of the first walls, which is between the two first cooling channels, are arranged on a second cooling channel of the plurality of second cooling channels.

8. The electricity storage device of claim 1, wherein in the first cooling layer, the plurality of first cooling channels includes at least four first cooling channels, each of the four first cooling channels having a different width.

\* \* \* \* \*